(12) United States Patent
Manzoor

(10) Patent No.: US 10,683,909 B2
(45) Date of Patent: Jun. 16, 2020

(54) TORSIONAL VIBRATION DAMPER WITH ADJUSTABLE TUNING

(71) Applicant: Suhale Manzoor, Plymouth, MI (US)

(72) Inventor: Suhale Manzoor, Plymouth, MI (US)

(73) Assignee: OPTIMIZED SOLUTIONS, LLC, Plymouth, MI (US)

( * ) Notice: Subject to any disclaimer, the term of this patent is extended or adjusted under 35 U.S.C. 154(b) by 65 days.

(21) Appl. No.: 16/207,266

(22) Filed: Dec. 3, 2018

(65) Prior Publication Data

US 2019/0178335 A1 Jun. 13, 2019

Related U.S. Application Data

(60) Provisional application No. 62/596,218, filed on Dec. 8, 2017.

(51) Int. Cl.
*F16F 15/14* (2006.01)

(52) U.S. Cl.
CPC .... *F16F 15/1442* (2013.01); *F16F 2224/025* (2013.01); *F16F 2224/0208* (2013.01); *F16F 2230/0005* (2013.01)

(58) Field of Classification Search
CPC ............ B64C 27/001; F16F 2230/0005; F16F 2224/025; F16F 2224/0208; F16F 7/104; F16F 7/116; F16F 7/1005; F16F 7/10; F16F 15/1442; F16F 15/1457; F16F 15/173; F16F 1/3873; F16F 1/3821
USPC ........ 188/380, 267, 378, 379; 267/137, 141, 267/292, 293
See application file for complete search history.

(56) References Cited

U.S. PATENT DOCUMENTS

| | | | |
|---|---|---|---|
| 3,075,406 A * | 1/1963 | Butler, Jr. | F16F 15/1442 74/574.4 |
| 6,581,267 B1 * | 6/2003 | Olbrich | F16F 15/1442 29/235 |
| 2010/0219301 A1 * | 9/2010 | Sampson | F16L 3/1083 248/74.1 |
| 2010/0243855 A1 * | 9/2010 | Sampson | F16L 3/123 248/534 |

* cited by examiner

*Primary Examiner* — Robert A. Siconolfi
*Assistant Examiner* — Sam M Aung

(57) ABSTRACT

The disclosed invention is a novel method for constructing a Torsional Vibration Damper where the device can be radially installed onto a fully assembled vibrating shaft or flange. Furthermore, the device can be adjusted for frequency during its assembly, essentially eliminating the need for multiple parts, and simultaneously eliminating human/ machine error from switching parts across vehicular platforms due to their identical visual appearance.

14 Claims, 2 Drawing Sheets

TORSIONAL VIBRATION DAMPER WITH ADJUSTABLE TUNING

FIELD OF INVENTION

The present invention generally relates to a device for attenuating torsional vibration inherent to certain rotating shafts. More particularly the invention discloses a novel method for constructing a Torsional Vibration Damper where the device can be radially installed onto a fully assembled vibrating shaft or flange in an automotive driveline, and the frequency of which may be adjusted during assembly.

BACKGROUND

Rotating shafts have torsional vibrations inherent due to their non-uniform construction (e.g. crankshafts, and camshafts), or the nature of the driving mechanism employed (e.g. firing order of an internal combustion engine, or gearing), or the method employed for their connection to another shaft (e.g. through a universal, or a constant-velocity joint). These torsional vibrations if left unattended reach a peak amplitude when their exciting frequency approaches the natural torsional frequency of the shaft. This phenomenon known as resonance can cause premature fatigue failure of the shaft, or can be felt as undesirable noise or vibration by a vehicle or machine operator.

Torsional Vibration Dampers (TVDs) are commonly employed to attenuate such undesirable vibrations. The objective of a TVD is break the vibratory amplitude peak at resonance to two (or more) smaller peaks each of which have sufficiently reduced amplitudes that can be sustained by the shaft.

In vehicle driveline applications, there are two common types of TVDs that are employed—internal and external. Internal TVDs are mounted on the surface defined by the Inner Diameter ("ID") of the drive-shaft, prop-shaft, or half-shaft ("shaft"); while the external TVDs are mounted on the surface defined by the Outer Diameter ("OD") of the shaft or on the OD of the flanges located on either end of the shaft. The disclosed invention only pertains to external TVDs.

The simplest version of an external TVDs comprises of two components, a metallic ring that provides the requisite amount of inertia necessitated for the TVD to be effective in the application, and an elastomer element (usually a ring or a strip) that is press-fitted between the shaft and the ring. The elastomer element serves two purposes: (1) it provides the spring-dashpot system for TVD to function; and (2) it provides the adequate hydro-static pressure by being assembled under compression that holds the TVD axially in place on the shaft.

The common materials used for the ring include but are not limited to steel, cast-irons, and aluminum alloys. The common materials used for the elastomer element include but are not limited to Ethelene Propylene Diene Monomer ("EPDM"), Styrene Butadiene Rubber ("SBR"), and Poly Butadiene ("PBD").

FIG. 1 illustrates two examples of prior art. In the first example on the bottom right the TVD comprising of ring 1 and elastomer 2 is installed directly onto Shaft 3. This is because the OD surface 32 of shaft 3 is large enough to receive the ID surface 21 of elastomer 2.

In the second example on the top left is where the TVD is installed onto flange 5 instead of shaft 3. In this illustration, the OD surface 51 of flange 5 is not sufficiently large to receive the ID surface 21' of elastomer 2', an additional component namely the hub 4 is incorporated into the design. Hub 4 bears an OD surface 42 that is sufficiently large to receive the ID surface 21' of elastomer 2'. Furthermore, the ID surface 41 of the hub 4 rigidly mounts (usually via a press-fit) on the OD surface 51 of flange 5.

Of these two constructions, the former is preferred over the latter (i.e. in FIG. 1 bottom right construction is preferred over the top left) for two reasons: (1) its cost-effectiveness, as it comprises of only two components, and (2) its ease of installation onto the shaft or flange ("S/F"), as an elastomer-to-metal press-fit is more forgiving than a metal-to-metal press-fit. The disclosed invention only pertains to TVDs that are installed without a hub directly onto S/F.

Installation of a traditional TVD is usually accomplished before the shaft accepts flanges on either end that have a diameter larger than the mounting diameter of the TVD, or the shaft is flared (deformed partially along its axial length to a diameter larger than the mounting diameter of the TVD). This greatly restricts the manufacturing process of the shaft, which now must be shipped to the TVD manufacturer for the TVD installation and then shipped back to the shaft manufacturer for the completion of its assembly; or alternately the TVD must be received as a component ready for installation onto the S/F early in the manufacturing process. This method of installation of the TVD onto the S/F is known as axial-installation, and is the traditional method employed in the industry.

The need for a TVD that can be installed onto the fully assembled S/F has been long realized. This need is particularly magnified during Noise Vibration and Harshness (NVH) related testing of the drive-shaft where TVDs of varying frequencies are mounted on the S/F to determine their NVH effectiveness. This need has traditionally been fulfilled by using a two-piece bolt-on design.

FIG. 2 illustrates a two-piece bolt-on design. Elastomer 2a usually comprises of two strips and is received directly on its ID surface by S/F 3a and ring 1a comprising of two mirrored half-rings that are held in place together by two bolts 6a. This allows elastomer 2a to be compressed by the bolt-preload, and hold the TVD axially in place on S/F 3a. This method of installation of the TVD onto the S/F is known as radial-installation Such a design illustrated in FIG. 2 has three inherent problems: (1) it forces the manufacturing of the TVD to be overly expensive (considering the counterbored holes and the corresponding threaded holes); (2) it puts a limitation on size of the TVD (mass and geometric) as the half-rings must accept bolts of a reasonable size (required for the necessary preload); (3) it is overly cumbersome to install such a TVD in a manufacturing environment, as several components need to be precisely aligned before the fasteners may be loaded, coupled by the necessity of preloading both fasteners simultaneously for proper (uniform) compression of the elastomer. Consequently, the use of the two-piece bolt-on TVD has been limited to prototype testing where its ability to be radially mounted overweighs its associated shortcomings.

Furthermore, in many such S/F applications, it is often desired that the same components (same geometry and same material) of the TVD (ring and elastomer) be used with minor frequency adjustments across different vehicular platforms. Traditionally this could only be fulfilled via producing the same ring and coupling it with elastomers having the same geometry but varying hardness' (durometers) across different vehicular platforms. Thereby, adjusting the frequency of the TVD by altering material properties of the elastomer. This causes two additional problems: (1) it necessitates the generation of several part-numbers thereby complicating logistics; and (2) it is prone to human/machine error that TVDs from one platform may mistakenly be switched with those from another platform due to their identical visual appearance.

SUMMARY OF INVENTION

The disclosed invention teaches a novel method for constructing a TVD where the device can be radially installed onto a fully assembled S/F in an automotive driveline, and the frequency of which may be adjusted during assembly.

The TVD ring comprises of two half rings that have an internal feature for self-alignment with the elastomer, thereby eliminating the need for precise alignment during assembly, and an external feature for centering a commercially available open radial clamp that holds the TVD axially in place on the S/F.

Furthermore, by intentionally making the elastomer axially smaller than the self-alignment feature and increasing the gap between the half rings, it is possible to make frequency adjustments to the TVD during assembly, by merely adjusting the clamping force.

This invention and the method of assembly thereof may be further appreciated considering the following detailed description and drawings in which:

DETAILED DESCRIPTION

Figure 1:
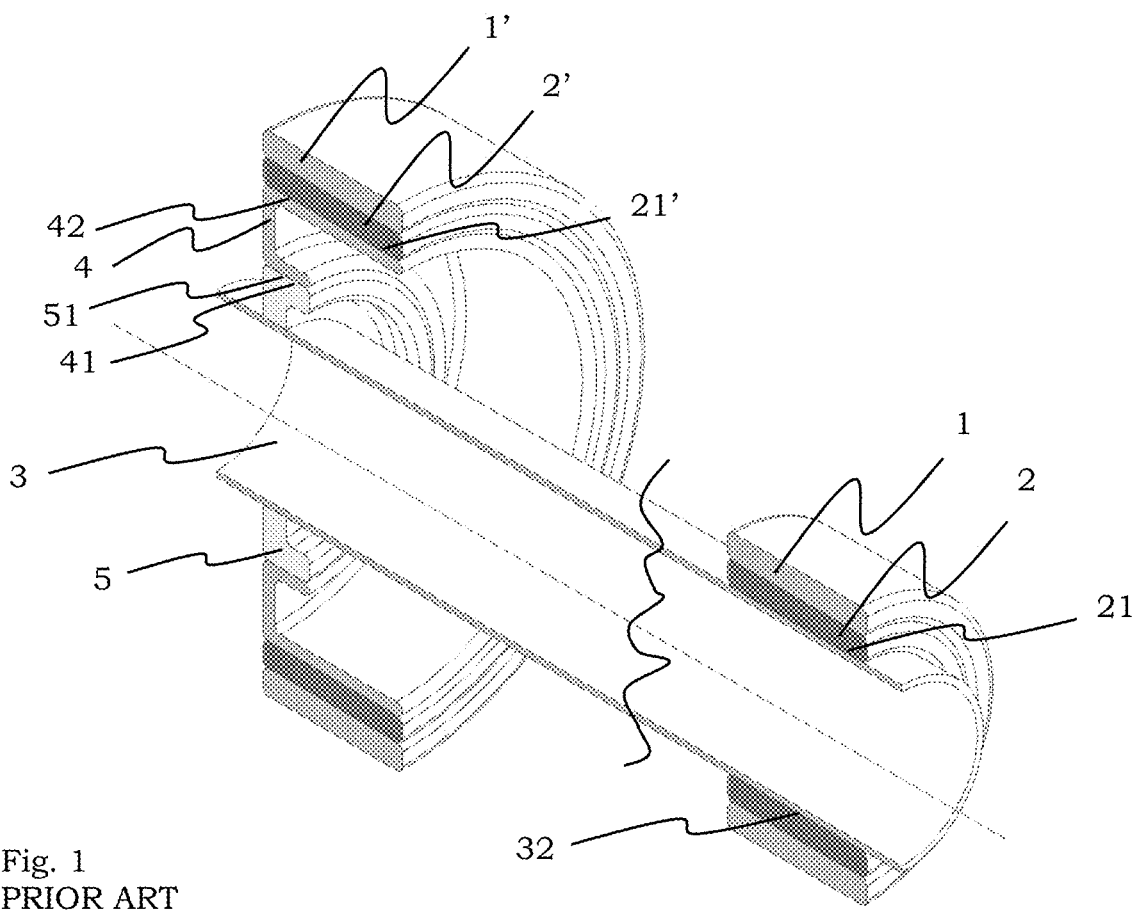
FIG. 1 is a partial cross-section illustrating two commonly used conventional TVDs (with and without a hub).
Figure 2:
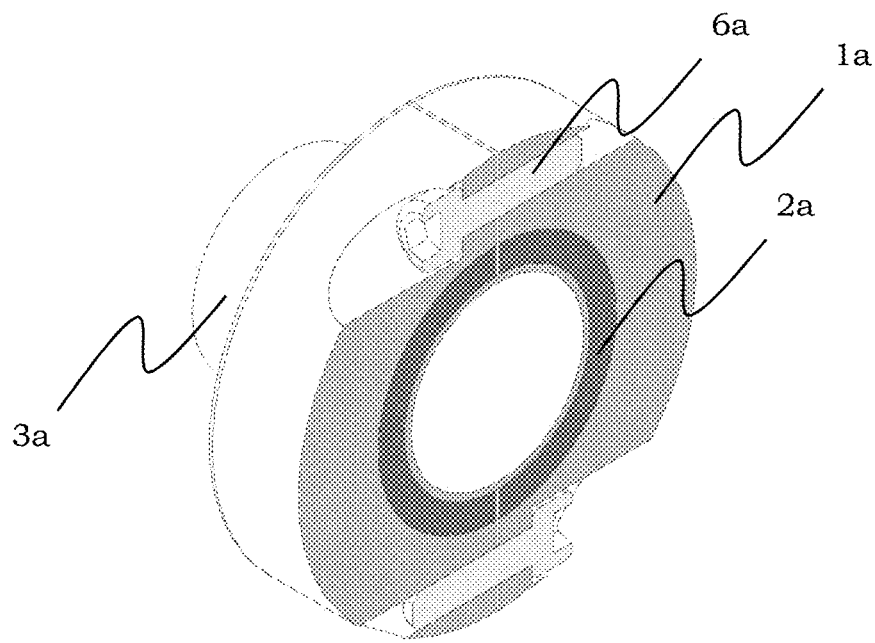
FIG. 2 is a partial cross-section illustrating a two-piece bolt on style prototype TVD.
Figure 3:
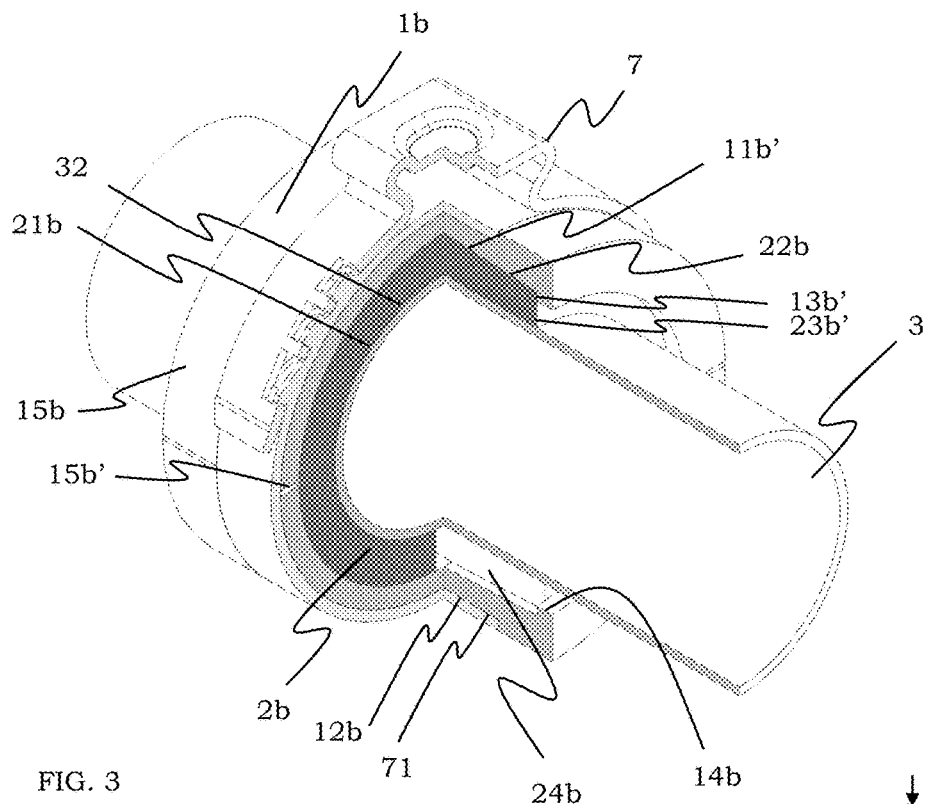
FIG. 3 is a partial cross-section illustrating an embodiment of the invention where the ring contains the elastomer axially.

FIG. 3 illustrates an embodiment of the invention that comprises of three components namely elastomer $2b$, ring $1b$, and clamp 7 arranged in a proximate to a distal radial direction over shaft 3.

The materials that may be used for ring $1b$ include but are not limited to steels, cast-irons, and aluminum alloys. The materials that may be used for elastomer $2b$ include but are not limited to EPDM, SBR, and PBD.

The clamp 7 is a commercially available component that may be constructed from materials including but not limited to steels, aluminum alloys, and various composite materials. Such clamps are generally known in the industry by names including but not limited to: hose-clamps, CV-boot-clamps, worm-gear-clamps, ear-style clamps, Oetiker®-clamps, etc. There are two categories of such clamps—open and closed. An open clamp is necessitated when the S/F is in its fully assembled condition. Such a clamp starts out as a flat strip that is wrapped around the ring and then tightened to hold the TVD axially in place on S/F. The disclosed invention only uses the open category of clamps as it enables radial installation of the TVD onto the fully assembled S/F.

Elastomer $2b$ may be manufactured either in the form of a strip or a Ring with a Radial Slit (RRS) across its wall thickness $24b$. For ease of assembly, the RSS is preferred over a strip as it inherently wraps around S/F 3 and maintains its position during installation. Furthermore, the RRS construction gives elastomer $2b$ a natural draft that has a maximum OD at its axial center-point and a minimum OD at both its axial peripheries, and can be used for alignment to ring $1b$ (explained below). Radial slit $24b$ allows elastomer $2b$ to be opened and wrapped around S/F 3 during installation. The ID surface $21b$ of elastomer $2b$ is received by the OD surface 32 of shaft 3.

Ring $1b$ is split into two half-rings and is tubular in shape after installation with two additional features machined into its compound ID surface $11b$ (meaning comprising of two half surfaces) $14b$ and its compound OD surface $15b$ respectively. The compound ID surface $14b$ of ring $1b$ has a radially indented axis-symmetric alignment channel along its circumference defined by two axially opposing compound planar annular surfaces $13b'$ that are bounded by a double tapered compound axis-symmetric surface $11b'$ that has a maximum diameter at its axial center-point and a minimum diameter at both its axial peripheries. This double tapered compound surface $11b'$ is designed to mate with the natural draft present in the axis-symmetric OD surface $22b$ of elastomer $2b$, and ultimately acts as an alignment feature to ensure the proper seating of elastomer $2b$ with respect to ring $1b$.

The compound OD surface $15b$ of ring $1b$ has a radially indented axis-symmetric channel along its circumference defined by two axially opposing compound planar annular surfaces $11b'$ that are radially bounded by a compound cylindrical surface $12b$. This channel is meant to receive the ID surface 71 of clamp 7 to ensure its proper seating during installation.

The preferred method for manufacturing ring $1b$ is to fully machine a tubular structure with both ID and OD channels and then split it into two parts with the intended radial gaps between them, thereby ensuring the proper alignment of all the features. Like the elastomer $2b$, the reason for splitting the ring $1b$ is to enable its radial installation onto elastomer $2b$.

Figure 4:
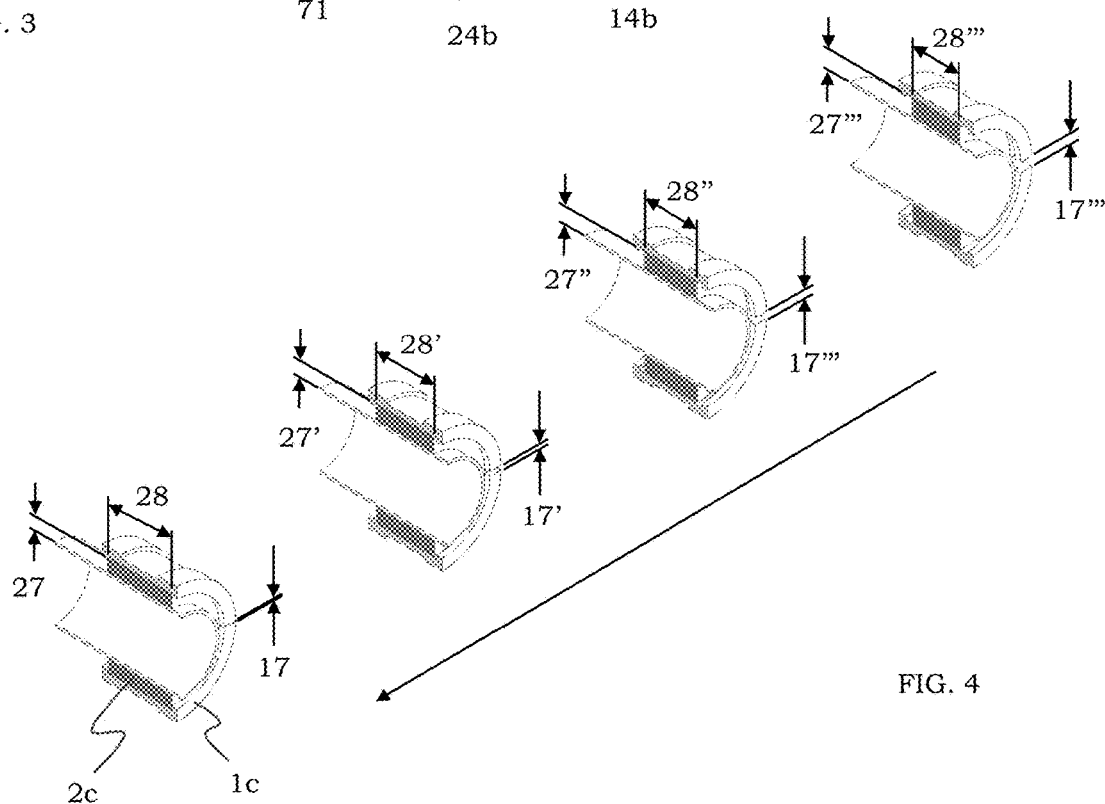
FIG. 4 is a partial cross-section illustrating the method by which the TVD tuning may be altered during assembly by controlling the clamping force.

FIG. 4 Illustrates the process by which the TVD frequency may be adjusted during installation by controlling the amount of clamp force. By intentionally designing elastomer $2c$ axially smaller than the indented alignment feature in ring $1c$ and maintaining a larger gap 17 between the half rings, it is possible to tighten the clamp (not shown) progressively to impart different levels of compression to elastomer $2c$. The direction of the arrow in FIG. 4 illustrates the progressive tightening of the clamp and its effect on three dimensions 17, 27, and 28 of elastomer $2c$. The frequency of the TVD correspondingly increases in the direction of the arrow due to three separate mechanisms at play.

First, the OD of ring $1c$ progressively decreases as dimension 17 decreases in the direction of the arrow in FIG. 4 ($17'''>17''>17'>17$), the Radius of Gyration ("RG") for the ring $1c$ is decreased. It is known (published) that the Polar Mass Moment of Inertia ("PMMI") is directly proportional to $RG^2$ (with everything else remaining constant); therefore, the PMMI of the TVD decreases progressively in the direction of the arrow in FIG. 4. It is also known (published) that the torsional frequency of a TVD is inversely proportional to the PMMI. Therefore, the torsional frequency of the TVD progressively increases in the direction of the arrow in FIG. 4.

Second, the installed width 28 of elastomer $2c$ progressively increases in the direction of the arrow in FIG. 4 ($28>28'>28''>28'''$). It is known (published) that the installed width of the elastomer in a TVD is directly proportional to the torsional frequency of the TVD (with everything else remaining constant). Therefore, the torsional frequency of the TVD progressively increases in the direction of the arrow in FIG. 4.

Third, the installed thickness 27 of elastomer 2c progressively decreases in the direction of the arrow in FIG. 4 (27'''>27''>27'>27). It is known (published) that the installed thickness of the elastomer in a TVD is inversely proportional to the torsional frequency of the TVD (with everything else remaining constant). Therefore, the torsional frequency of the TVD progressively increases in the direction of the arrow in FIG. 4.

It must be appreciated that the elastomer for a TVDs is usually about 5 mm in thickness before installation and is imparted a compression of about 30% for structural stability. Meaning that the elastomer thickness after installation must be 30% less than the elastomer thickness before installation. Therefore, for a 30% compression case for a 5 mm thick elastomer before installation, mathematically the dimension after installation is 5 mm×0.70=3.5 mm, therefore requiring a diametric compression of 2×(5 mm−3.5 mm)=3 mm. The clamp that imparts the radial tightening load must be capable of the same compression.

For a standard ear-type clamp (e.g. those manufactured by Oetiker® and listed as Product Group 163 family of clamps in their catalogue), the diametric reduction after installation is measured by Ear-Width/3.142. The commercially available clamps in the region of interest for TVD construction have an Ear-Width of 10 mm, which then allows a diametric reduction of 10 mm/3.142=approximately 3.2 mm. For a standard worm gear type clamp, the diametric reduction range is much larger and not a concern. This example is meant to illustrate that specialty clamps are not necessitated for the disclosed invention and clamps that are commercially available in the market may be used.

The invention claimed is:

1. A Torsional Vibration Damper ("TVD"), comprising:
an elastomer member ("elastomer") including
    a first planar annular surface with a radial slit oriented perpendicular to the Central Axis ("CL") of the TVD;
    a second planar annular surface, identical to and axially opposing, the first planar annular surface;
    a partially cylindrical Inner Diameter ("ID") surface that bounds the first and second planar annular surfaces located radially proximate to the CL;
    a partially axisymmetric Outer Diameter ("OD") surface that bounds the first and second planar annular surfaces located radially distal to the CL, further including
        a first tapered surface extending from the axial center-point of the elastomer to the first planar annular surface;
        a second tapered surface extending from the axial center-point of the elastomer to the second planar annular surface;
        such that first and second tapered surfaces have the same OD at the axial center-point of the elastomer and the same ID at either axial periphery of the elastomer;
a compound ring ("ring") comprising of two identical metallic "C" shaped half-rings, each including
    a first planar semi-annular surface oriented perpendicular to the CL;
    a second planar semi-annular surface, identical to and axially opposing, the first planar semi-annular surface;
    a partially axisymmetric ID surface that bounds the first and second semi-annular planar surfaces, located radially proximate to the CL, further including
        an indented channel located axially symmetrically about the axial center-point of the TVD further including
            a first planar semi-annular surface oriented perpendicular to the CL;
            a second planar semi-annular surface, identical to and axially opposing, the first planar semi-annular surface;
            a first tapered surface extending from the axial center-point of the ring to the first planar semi-annular surface;
            a second tapered surface extending from the axial center-point of the ring to the second planar semi-annular surface;
            such that first and second tapered surfaces have the same OD at the axial center-point of the ring and the same ID at either axial periphery of the channel and mate radially with the partially axisymmetric OD surface of the elastomer;
    a partially cylindrical OD surface that bounds the first and second semi-annular surfaces, located radially distal to the CL, further including
        an indented channel that is located axially symmetrically about the axial center-point of the ring further including
            a first planar semi-annular surface oriented perpendicular to the CL;
            a second planar semi-annular surface identical to and axially opposing the first planar semi-annular surface;
            a semi cylindrical OD surface that bounds the first and second planar semi-annular surfaces;
    an open radial clamp sized to mate axially and radially with the compound channel defined on the OD surface of the ring;
such that during installation, the partially cylindrical ID surface of the elastomer is radially installed onto the vibrating shaft or flange (S/F) by opening the elastomer at the radial slit, followed by radially installing the two half-rings into the ring with two diametrically opposing radial slits, followed by radially installing the open style radial clamp in the compound channel present on the OD surface of the ring, and finally axially holding the TVD in place on the S/F by a diametric reduction of the open radial clamp.

2. The TVD defined in claim 1 wherein the elastomer consists of two or more segments that allow its radial assembly onto the SF.

3. The TVD defined in claim 1 where the OD surface of the elastomer is not tapered, and the mating surfaces on the ID channel of the ring are tapered.

4. The TVD defined in claim 1 where the OD surface of the elastomer is not tapered, and the mating surfaces on the ID channel of the ring are also not tapered.

5. The TVD defined in claim 1 where the ID surface of the ring bears a double tapered surface axially symmetric about the axial center-point of the TVD, that is not contained within an indented channel, thereby allowing the elastomer to axially squeeze out of the ring during installation and form a pseudo ledge on either axial periphery that centrally aligns the ring to the elastomer.

6. The TVD defined in claim 1 where the ID surface of the ring bears a cylindrical surface axially symmetric about the axial center-point of the TVD, that is not contained within an indented channel, thereby allowing the elastomer to axially squeeze out of the ring during installation and form a pseudo ledge on either axial periphery that centrally aligns the ring to the elastomer.

7. The TVD defined in claim 1 where the ring comprises of two partial rings that are not identical in geometry.

8. The TVD defined in claim 1 where the ring comprises of more than two partial rings that are identical in geometry.

9. The TVD defined in claim 1 where the channel for receiving the open radial clamp is not axially symmetric to the axial center-point of the TVD.

10. The TVD defined in claim 1 where the channel for receiving the open radial clamp is absent from the OD surface of the half-rings.

11. The TVD defined in claim 1 wherein the open radial clamp has adjustable diametric reduction allowing a variable compression of the half rings and elastomer, thereby enabling the TVD to be tuned during assembly.

12. The TVD defined in claim 1 wherein the open style radial clamp has fixed diametric reduction allowing a fixed compression of the half rings and elastomer, thereby enabling the TVD to have a singular tuning.

13. The TVD defined in claim 1 including two or more radially oriented compound channels on the ID surface of the ring that receive two or more elastomer members.

14. The TVD defined in claim 1 including two or more radially oriented compound channels on the OD surface of the ring that receive two or more radial clamps.

* * * * *